(12) United States Patent
Foote

(10) Patent No.: US 7,368,923 B2
(45) Date of Patent: May 6, 2008

(54) TIME INTERVAL TRIMMED DIFFERENTIAL CAPACITANCE SENSOR

(75) Inventor: Steven A. Foote, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 202 days.

(21) Appl. No.: 11/317,383

(22) Filed: Dec. 22, 2005

(65) Prior Publication Data

US 2007/0146019 A1 Jun. 28, 2007

(51) Int. Cl.
*G01R 27/26* (2006.01)
*H03K 5/01* (2006.01)

(52) U.S. Cl. .............. 324/686; 324/678; 324/658; 327/100

(58) Field of Classification Search ........... 324/754, 324/678, 658, 686; 327/509–517, 100
See application file for complete search history.

(56) References Cited

U.S. PATENT DOCUMENTS

| | | | |
|---|---|---|---|
| 4,890,598 A | 1/1990 | Kinsworthy | |
| 5,311,140 A * | 5/1994 | Permuy | 324/680 |
| 5,367,217 A | 11/1994 | Norling | |
| 5,450,762 A | 9/1995 | Woodruff et al. | |
| 5,456,111 A | 10/1995 | Hulsing, II | |
| 5,597,956 A * | 1/1997 | Ito et al. | 73/514.18 |
| 5,682,788 A * | 11/1997 | Netzer | 73/73 |
| 5,717,140 A | 2/1998 | Hulsing, II | |
| 5,744,968 A * | 4/1998 | Czarnocki et al. | 324/608 |
| 6,269,698 B1 | 8/2001 | Woodruff | |
| 6,366,099 B1 * | 4/2002 | Reddi | 324/678 |
| 6,530,275 B1 * | 3/2003 | Hollocher et al. | 73/514.18 |
| 6,949,937 B2 * | 9/2005 | Knoedgen | 324/658 |

* cited by examiner

*Primary Examiner*—Dinh T. Le
(74) *Attorney, Agent, or Firm*—Black Lowe & Graham PLLC

(57) ABSTRACT

An apparatus and method for operation of a differential capacitance transducer, including generating substantially opposing polarity excitation drive signals by operation of a pair of drive signal generators, applying the excitation drive signals to a pair of sense capacitors of a differential capacitance sensor, sensing a differential capacitance at a common junction between the pair of sense capacitors; and individually controlling the drive signal generators for trimming a null bias of the sense capacitor pair at the common junction.

20 Claims, 4 Drawing Sheets

TIME INTERVAL TRIMMED DIFFERENTIAL CAPACITANCE SENSOR

FIELD OF THE INVENTION

The present invention relates to differential capacitance sensor devices and methods, and in particular to null bias trimming of capacitive sensing circuits at zero displacement.

BACKGROUND OF THE INVENTION

Differential capacitance sensor devices are generally well-known. Modern accelerometers, pressure transducers, and similar transducers often employ a differential capacitance system to detect the null position or motion of a sensing element, e.g., either a proof-mass or diaphragm, as the basic mechanical-to-electrical conversion principle. This is particularly true of Micro Electro-Mechanical System (MEMS) sensor devices in which utilization of differential capacitance is nearly ubiquitous. A major cost driver in the production of sensor devices that use differential capacitance to detect null or motion of the sensing element is a need to trim the capacitive sensing system to null at zero displacement.

Existing differential capacitance detector drive circuits typically apply opposite polarity or "mirrored" excitation signals to a differential sensor capacitor pair. All things being equal, this produces a null signal at a common junction between the capacitor pair as input to a transimpedence amplifier. In a practical sensor, the mirrored excitation signals result in a biased null signal at the common junction at zero displacement of the capacitor pair because the circuit cannot be perfectly balanced and the two sense capacitors forming the capacitor pair cannot be exactly identical. Accordingly, prior art circuits have traditionally introduced front end bias trimming to produce a null signal at zero displacement by addition of a programmable capacitor array.

These additional capacitor arrays may be applied in various configurations. For example, existing differential capacitance detector drive circuits typically utilize either parallel bias trim arrays or drive level bias trim arrays for trimming the capacitive sensing system to null at zero displacement.

FIG. 1 illustrates a typical parallel configuration example of an existing detector drive circuit 1 having a drive portion 2 having a pair of drive signal generators 2a and 2b that are structured to apply opposite polarity or "mirrored" excitation signals to two sense capacitors 3a and 3b of a differential capacitance sensor 3. If the circuit is perfectly balanced and the two sense capacitors 3a, 3b are exactly identical, application of these mirrored excitation signals produces a null at a common junction 4 between the capacitor pair 3a, 3b at zero displacement as input to a transimpedence amplifier 5. In a practical differential capacitance sensor, the signal is biased, or not null, at the common junction 4 at zero displacement of the capacitor pair 3a, 3b. Accordingly, front end bias trimming is introduced via a programmable capacitor array 6 to produce the null signal.

The bias trim capacitor array 6 is switched into the circuit 1 in parallel with a smaller of the two sense capacitors 3a or 3b to bring it into equity with the larger. The null signal now produced at the common junction 4 between the capacitor pair 3a, 3b at zero displacement is input to the transimpedence amplifier 5. Output of the transimpedence amplifier 5 serves as input to a variable gain amplifier 7, which amplified signal is output to a synchronous demodulator 8 whose output is filtered through a filter buffer 9.

FIG. 2 illustrates another common configuration of the detector drive circuit 1 that switches the bias trim capacitor array 6 into the path of the excitation drive signal output by the drive portion 2 to preferentially reduce the applied excitation voltage and thus, the effective signal from that side of the capacitor pair 3a, 3b.

Such front end bias trimming via the programmable bias trim capacitor array 6, as taught by the prior art, is both costly and difficult to implement adequately. As illustrated, the typical approaches require complex circuitry that is difficult to implement in discrete form, generally requiring a large investment in an application specific integrated circuit.

Therefore, devices and methods for overcoming these and other limitations of typical state of the art balancing of differential capacitance detector drive circuits in MEMS accelerometers, pressure transducers, and other transducer devices are desirable.

SUMMARY OF THE INVENTION

The present invention is an apparatus and method for operation of a differential capacitance transducer, including generating substantially opposing polarity excitation drive signals by operation of a pair of drive signal generators, applying the excitation drive signals to a pair of sense capacitors of a differential capacitance sensor, sensing a differential capacitance at a common junction between the pair of sense capacitors; and individually controlling the drive signal generators for trimming a null bias of the sense capacitor pair at the common junction.

The apparatus and method of the invention eliminate the complexity and expense of traditional switched bias trim capacitor arrays by individually commanding the timing of the opposing excitation drive signals. This individually commanding causes one of the two excitation drive signals to be widened relative to the other by an appropriate time interval (i) so that the two excitation drive signals are no longer exactly mirrored. The longer drive interval effectively increases the effective excitation drive signal, which increases the significance of the sensor capacitance on the wider, i.e., longer duration, drive side proportionally. Thus, the null bias is trimmed without the expensive switched bias trim capacitor arrays typical of prior art detector drive circuits. Furthermore, individual commanding of the excitation drive signals is controlled using a simple digital controller. When the signal generators generating the excitation drive signals are sourced as the division of a higher frequency clock oscillator, the drive excitation signal time widths are individually adjustable in time increments of the clock, whereby the trimmability ratio is equivalent to the ratio of the clock increment-to-drive width.

For example, when a 4 MHz basic clock is used to derive a 40 KHz excitation drive signal with a 50% duty cycle, the clock time increment are 1% of the excitation. Changing the width of one of the excitation signals by a single clock increment causes a 1% trim of the original differential capacitance imbalance. Finer bias trim resolution may be directly obtained via higher clock rate-to-drive ratios.

According to one aspect of the invention, jitter is added to the drive so that the trim increment is not constant each drive cycle, which provides better resolution.

According to another aspect of the invention, scale factor is trimmed using the same digital controller providing the bias null trim. By example and without limitation, the scale factor trim circuit time-increments a gate switch to the synchronous demodulator, letting only a portion of the signal through that is proportional to the duty cycle of the switch. The "on" time of the switch is controlled, whereby the percentage of the total signal let through to the integrator/filter is controlled.

According to another aspect of the invention, a temperature compensation of one or both of the bias null trim and scale factor trim functions using the same digital controller and providing input from a temperature sensor. The digital controller is programmed to provide variable increments as a function of input from the temperature sensor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The Figures illustrate the apparatus and method of the present invention for a detector drive circuit for operation of a differential capacitance transducer device having novel null bias trimming.

Figure 1:
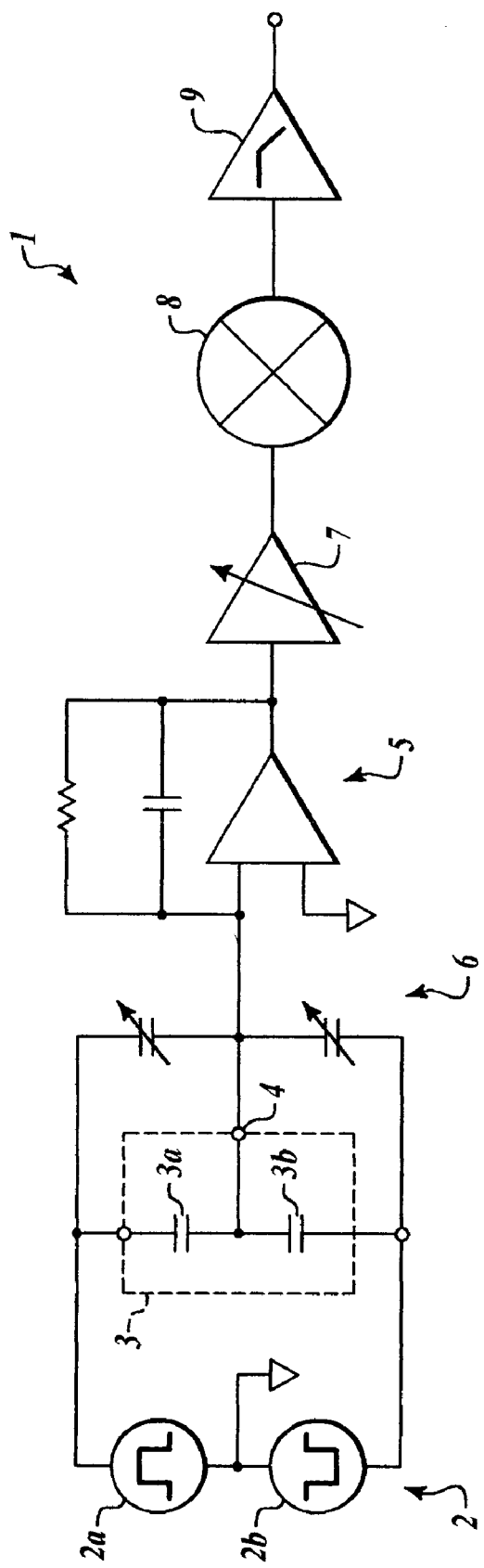
FIG. 1 illustrates a typical parallel configuration example of a detector drive circuit of the prior art having a drive circuit that is structured to apply opposite polarity or "mirrored" excitation signals to a differential capacitance sensor having two sense capacitors, with a bias trim capacitor array switched into the circuit in parallel with a smaller of the two sense capacitors.
Figure 2:
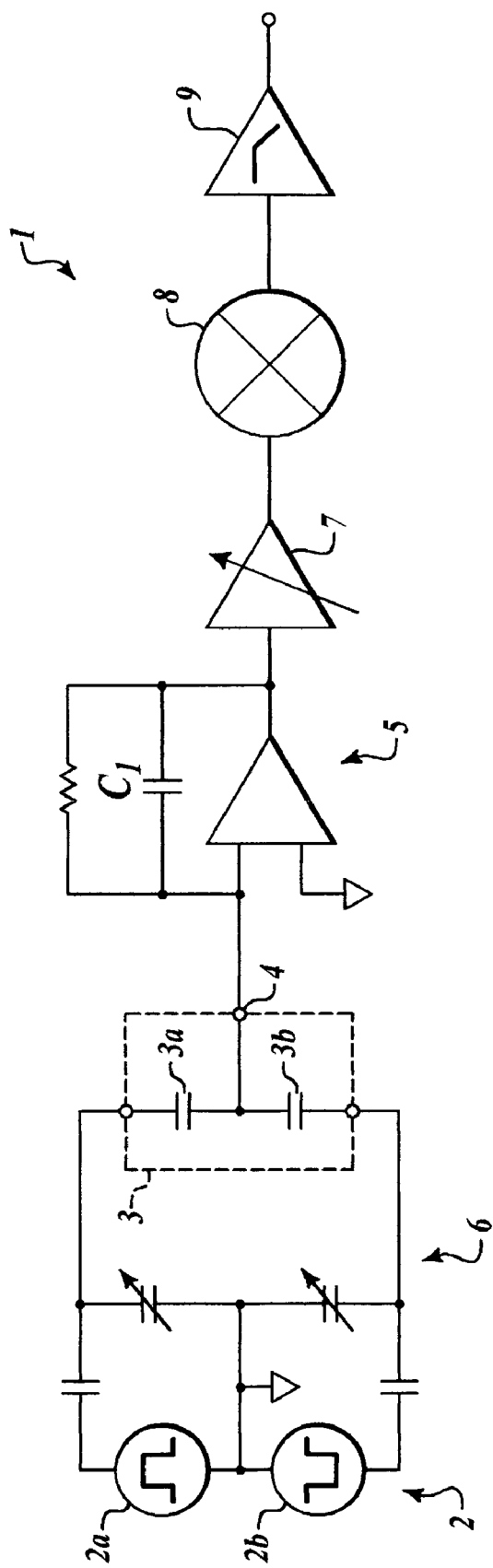
FIG. 2 illustrates another common configuration of the detector drive circuit of the prior art that switches the bias trim capacitor array into the path of the excitation drive signal output by the drive circuit to preferentially reduce the applied excitation voltage.
Figure 3:
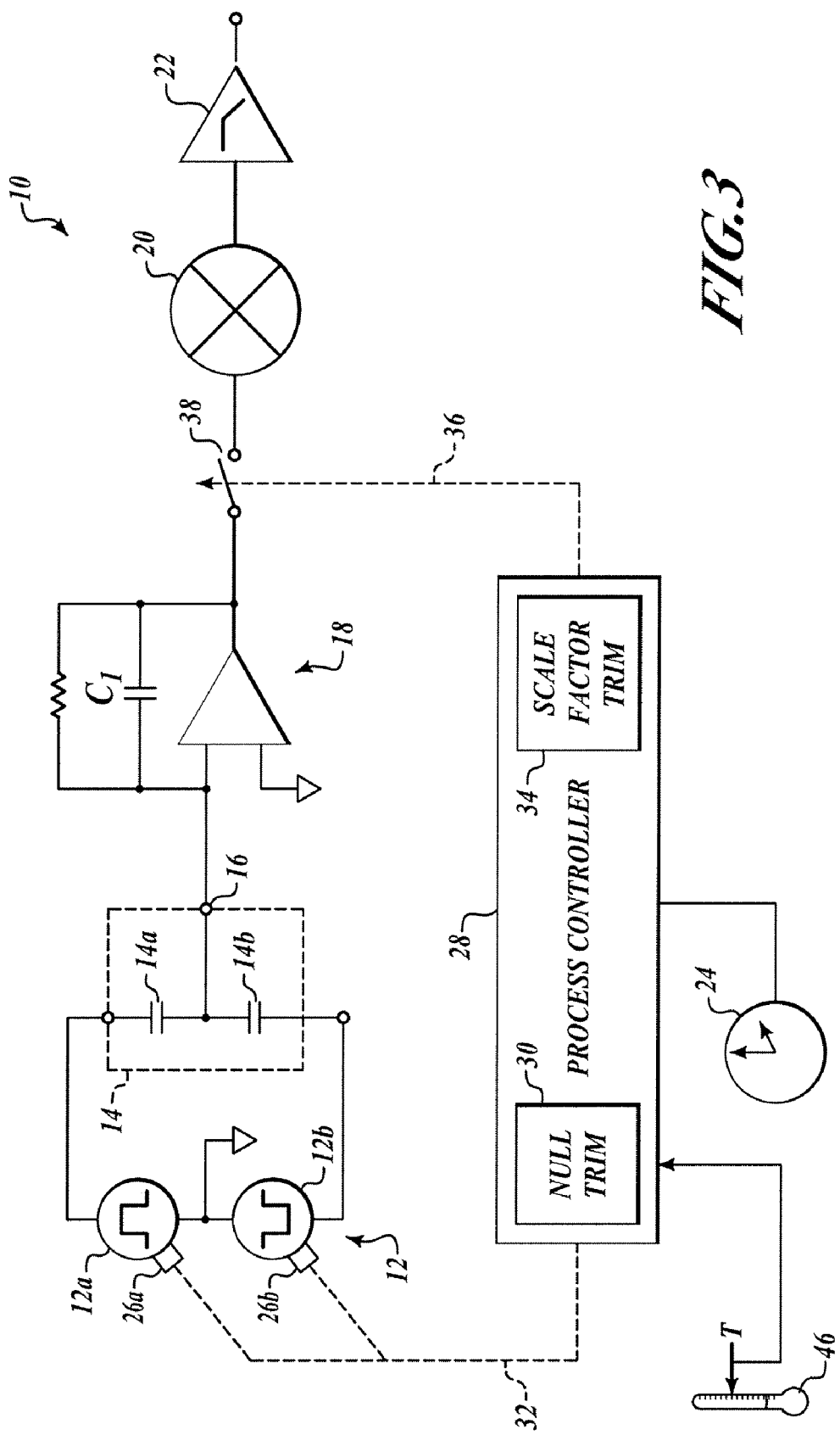
FIG. 3 is a schematic that, by example and without limitation, illustrates the null bias trimming apparatus and method of the invention embodied as a detector drive circuit.

FIG. 3 is a schematic that, by example and without limitation, illustrates the null bias trimming apparatus and method of the invention embodied as a detector drive circuit 10. The detector drive circuit 10 of the invention includes a drive circuit 12 having a pair of drive signal generators 12a and 12b that are structured to apply substantially opposing polarity excitation drive signals to two different sense capacitors 14a and 14b of a differential capacitance sensor 14. A common junction 16 between the capacitor pair 14a, 14b is coupled to a transimpedence amplifier 18. An output of the transimpedence amplifier 18 is coupled through a synchronous demodulator 20 having an output that is filtered through a filter buffer 22.

Excitation drive signals generated by the pair of signal generators 12a and 12b of the drive circuit 12 are sourced as the division of a high frequency system clock oscillator 24. A pair of switches 26a and 26b individually control the different drive signal generators 12a and 12b. A programmable digital controller 28 of a known type controls the individual switches 26a, 26b, and through the switches 26a, 26b individually controls the signal generators 12a, 12b and the excitation drive signals they generate. The excitation drive signals are generated by the signal generators 12a, 12b at an excitation frequency that is a fraction of the much higher clock frequency of the system clock oscillator 24.

According to the invention, a circuit 30 programmed by the digital controller 28 provides timing for operation of switches 26a, 26b to generate the sensor excitation and provide the null bias trim function. For example, the digital controller 28 is a conventional PIC processor or programmable logic array having an output line 32 coupled to the drive signal generators 12a, 12b. The digital controller 28 individually commands the drive signal generators 12a, 12b and thus the timing of the opposing excitation drive signals, whereby the null bias is substantially zero as measured at the common junction 16 between the capacitor pair 14a, 14b at zero displacement of a sensitive element (not shown). Accordingly, null bias is at the common junction 16 is trimmed without the typical expensive switched bias trim capacitor array 6 of the prior art.

Optionally, a scale factor trim function circuit 34 is provided by the digital controller 28. Accordingly, through another controller output line 36 the digital controller 28 commands a gate switch 38 that controls the signal fed into the synchronous demodulator 20. The scale factor trim function circuit 34 controls the "on" time of the synchronous demodulator switch 38. This control of the switch "on" time in turn controls a percent (%) of the total signal let through to the demodulator 20 and filter 22. For example, the scale factor trim function circuit 34 time-increments the synchronous demodulator gate switch 38 to the synchronous demodulator 20 for letting through only a portion of the output signal from the differential capacitance sensor 14. The portion of the signal allowed through by the synchronous demodulator switch 38 is proportional to the duty cycle of the switch 38. Control of the "on" time thus determines the percentage of the total signal allowed through to the demodulator 20 and filter 22, whereby the device scale factor is trimmed by the same digital controller 28 providing device null bias trim.

Figure 4:
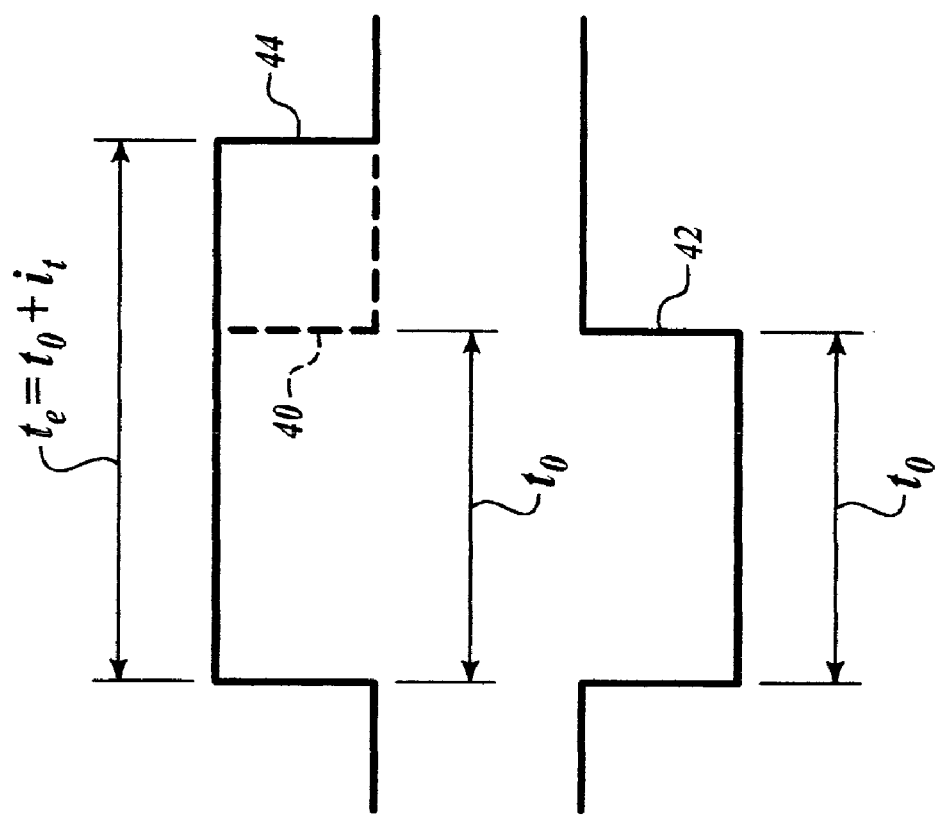
FIG. 4 illustrates the effect of the null bias trim function circuit of the invention on the excitation drive signals output by two drive signal generators as a function being individually controlled by a digital controller, according to the invention.

FIG. 4 illustrates the effect of the null bias trim function circuit 30 on the excitation drive signals output by the two drive signal generators 12a, 12b as a function being individually controlled by the digital controller 28 according to the invention, whereby the null bias trim function circuit 30 of the digital controller 28 individually commands the timing of the opposing excitation drive signals. This individually commanding of the excitation drive signal timing permits the excitation drive signal output by one of the two drive signal generators 12a (or 12b) to be widened relative to the other excitation drive signal output by the other of the two drive signal generators 12b (or 12a) by an appropriate trim time interval ($i_t$) such that the two excitation drive signals are not exactly mirrored, as they are in the prior art. Accordingly, an initial excitation drive signal 40 output by one of the two drive signal generators 12a (or 12b) is a mirror image of a excitation drive signal 42 of opposite polarity output by the other of the two drive signal generators 12b (or 12a), whereby both excitation drive signals 40 and 42 have the substantially identical length ($t_0$). According to the invention, the null bias trim function circuit 30 of the digital controller 28 individually commands the timing of one of the two drive signal generators 12a (or 12b) to generate an excitation drive signal 44 wherein the initial signal length ($t_0$) is lengthened by the appropriate trim time interval ($i_t$) to an extended signal length ($t_e$) according to:

$t_e = t_0 + i_t$, wherein the trim time interval ($i_t$) is one or more time increments (i) of the system clock 24.

The longer drive time interval ($t_e$) effectively increases the effective excitation drive signal which proportionally increases the significance of the sensor capacitance on the wider, i.e., longer duration, drive side. Thus, the null bias is trimmed without the expensive switched bias trimming arrays typical of the prior art. Furthermore, the individual excitation drive signals are controlled using the simple digital controller 28, according to the circuit 10 of a type illustrated in FIG. 3. The two drive signal generators 12a, 12b are sourced as the division of the clock oscillator 24 having higher frequency than excitation signal frequency. Therefore, it is possible using the circuit 10 to adjust the widths of the individual drive excitation time intervals $t_0$ and $t_e$ in time increments of the higher frequency clock 24. Adjusting the widths of the individual drive excitation time intervals $t_0$ and $t_e$ in one or more time increments (i) of the higher frequency clock 24 results in a trimmability ratio equivalent to the ratio of the clock increment-to-drive width, as demonstrated by the following example.

By example, the system clock oscillator 24 is selected to be a 4 MHz basic clock that is used to derive a 40 KHz excitation drive signal having a 50 percent duty cycle. In this example, the clock time increment are 1 percent of the drive excitation time intervals $t_0$. Thus, changing the width of one of the excitation signals by a single clock increment will result in a 1 percent trim of an initial differential capacitance imbalance. Finer bias trim resolution is directly obtained via higher clock rate-to-drive ratios. Alternatively, a second bias trim stage is added whereby a finer resolution bias trim is obtained by adding jitter to the drive excitation time interval, $t_e$ such that the drive fractionally alternates between the two time interval states. This results in an effective bias trim between the two states directly proportional to the fraction of time spent in either state. This fractional drive technique may easily gain several orders magnitude of trim resolution beyond the basic clock increment.

Optionally, the state machine controller 28 locks in a nominal clock-to-drive "skew" on power-up. Thereafter, the digital controller's null bias trim function circuit 30 controls the individual switches 26a, 26b as fine bias adjust switches.

These fine bias adjust switches 26a, 26b also function as temperature compensation for the detector drive circuit 10. The null bias trimming method of the invention also functions as a very low cost temperature compensation method when the digital process controller 28 is programmed to provide a variable quantity of the time increments (i) as a function of input from a system temperature sensor 46 (shown in FIG. 3) which is structured to output a temperature signal (T) representative of system temperature. The digital controller's null bias trim function circuit 30 is programmed to apply variable time increments (i) to one or both of the individual switches 26a, 26b for controlling the null bias trim as a function system temperature. Optionally, the digital controller's scale factor trim function circuit 34 is programmed to apply variable time increments (i) to the synchronous demodulator gate switch 38 for controlling the scale factor trim as a function system temperature.

Optionally, jitter is added to the drive through the digital controller's null bias trim function circuit 30 so that the bias trim increment $i_t$ is not constant each drive cycle. This jitter-induced inconsistency results in better resolution, but is expected to introduce lower frequency sidebands that may need to be filtered for some applications.

While the preferred embodiment of the invention has been illustrated and described, it will be appreciated that various changes can be made therein without departing from the spirit and scope of the invention.

What is claimed is:

1. A detector drive circuit for operation of a differential capacitance transducer, the circuit comprising:
   a pair of sense capacitors;
   a pair of drive signal generators in signal communication with the pair of sense capacitors, the pair of drive signal generators structured to apply respective substantially opposing polarity excitation drive signals to the respective sense capacitors; and
   a null bias trim circuit coupled for individually controlling the respective drive signal generators.

2. The circuit of claim 1, further comprising:
   a transimpedence amplifier coupled to a common junction between the pair of sense capacitors;
   a synchronous demodulator coupled to an output of the transimpedence amplifier; and
   a filter buffer coupled to an output of the synchronous demodulator.

3. The circuit of claim 2, further comprising a pair of switches coupled between the null bias trim circuit and the respective drive signal generators and being operated individually by the null bias trim circuit.

4. The circuit of claim 3, further comprising a digital controller comprising the null bias trim circuit.

5. The circuit of claim 4, further comprising a system clock oscillator in signal communication with the null bias trim circuit, each of the respective excitation drive signals having an excitation frequency that is a fraction of a clock frequency of the system clock oscillator.

6. The circuit of claim 5 wherein the respective excitation drive signals have different first and second time widths.

7. The circuit of claim 2, further comprising a switch between the transimpedence amplifier and the synchronous demodulator; and
   a scale factor trim circuit coupled for controlling the switch.

8. The circuit of claim 7, further comprising a temperature sensor coupled to output a temperature signal representative of system temperature to the scale factor trim circuit, the scale factor trim circuit being further structured for variable control of the switch as a function of the temperature signal.

9. The circuit of claim 1, further comprising a temperature sensor coupled to output a temperature signal representative of system temperature to the null bias trim circuit, the null bias trim circuit being further structured for variable control of the respective drive signal generators as a function of the temperature signal.

10. A detector drive circuit for operation of a differential capacitance transducer, the circuit comprising:
    a high frequency system clock oscillator;
    a differential capacitance sensor having first and second sense capacitors that are coupled to a common junction therebetween;
    a drive circuit in signal communication with the system clock oscillator, the drive circuit having first and second drive signal generators that are sourced as a division of the system clock oscillator and are structured to generate respective first and second substantially opposing polarity excitation drive signals, the first and second drive signal generators being coupled to apply the respective first and second excitation drive signals to the respective sense capacitors of the differential capacitance sensor;
    first and second switches coupled for controlling the respective first and second drive signal generators;

a programmable null bias trim circuit coupled for individually controlling the first and second switches;

a transimpedence amplifier coupled to the common junction between the sense capacitors;

a synchronous demodulator coupled to the transimpedence amplifier; and a filter buffer coupled to the synchronous demodulator.

11. The circuit of claim 10 wherein the null bias trim circuit is further structured for controlling the first and second switches to adjust drive excitation time widths of the respective individual first and second drive signal generators in time increments of the system clock oscillator.

12. The circuit of claim 11 wherein the null bias trim circuit is further structured to individually control the first of the signal generators to generate the first excitation drive signal having a first width, and is further structured to individually control the second signal generator to generate the second excitation drive signal having a second width that is different from the first width by one or more clock increments.

13. The circuit of claim 10, further comprising a gate switch between the transimpedence amplifier and the synchronous demodulator; and a programmable scale factor trim circuit coupled for controlling the gate switch.

14. The circuit of claim 13 wherein at least one of the programmable null bias trim circuit and the programmable scale factor trim circuit is further coupled for receiving a temperature signal representative of system temperature, and at least one of the programmable null bias trim circuit and the programmable scale factor trim circuit is further structured for variable control of the drive signal generators and the gate switch, respectively, as a function of the temperature signal.

15. A method for operation of a differential capacitance transducer, the method comprising:

generating first and second substantially opposing polarity excitation drive signals by operation of respective first and second drive signal generators;

applying the first and second excitation drive signals to respective first and second sense capacitors of a differential capacitance sensor;

sensing a differential capacitance at a common junction between the first and second sense capacitors; and individually controlling the respective first and second drive signal generators for trimming a null bias of the first and second sense capacitors at the common junction.

16. The method of claim 15 wherein generating first and second substantially opposing polarity excitation drive signals further comprises sourcing the respective first and second drive signal generators as the division of a high frequency system clock oscillator.

17. The method of claim 16 wherein individually controlling the respective first and second drive signal generators further comprises individually adjusting drive excitation time widths of the respective first and second drive signal generators in time increments of the system clock oscillator.

18. The method of claim 17, further comprising controlling a gate switch for passing only a portion of a differential capacitance signal received at the common junction, the portion of the signal passed being proportional to a duty cycle of the switch.

19. The method of claim 17, further comprising alternating the excitation drive signals between different time increments of the system clock oscillator to obtain a higher resolution trimming function.

20. The method of claim 19 wherein individually controlling the respective first and second drive signal generators further comprises individually controlling first and second switches coupled for individually controlling the respective first and second drive signal generators.

* * * * *